United States Patent [19]

Israel

[11] Patent Number: 4,890,446
[45] Date of Patent: Jan. 2, 1990

[54] MULCHING ATTACHMENT FOR LAWN MOWERS

[76] Inventor: Bert L. Israel, 609 Cumberland Rd., Fredericksburg, Va. 22405

[21] Appl. No.: 301,140

[22] Filed: Jan. 25, 1989

[51] Int. Cl.⁴ ...................... A01D 34/64; A01D 34/73
[52] U.S. Cl. ...................................... 56/17.5; 56/255; 56/320.2; 56/DIG. 9
[58] Field of Search ............. 56/255, 17.5, 295, 320.1, 56/320.2, 202, DIG. 9, DIG. 13, DIG. 20

[56] References Cited

U.S. PATENT DOCUMENTS

| | | | |
|---|---|---|---|
| 2,791,080 | 5/1957 | Shaw | 56/17.5 X |
| 2,836,024 | 5/1958 | Davis et al. | 56/255 X |
| 3,242,660 | 3/1966 | Gary | 56/255 U X |
| 3,884,020 | 5/1975 | Dahl et al. | 56/320.2 |
| 4,189,903 | 2/1980 | Jackson et al. | 56/255 |
| 4,205,512 | 6/1980 | Thorud | 56/255 X |

*Primary Examiner*—Stephen J. Novosad
*Attorney, Agent, or Firm*—Larson and Taylor

[57] ABSTRACT

A mulching attachment is provided which is adapted to be detachably secured in place within the cavity defined by the deck of a lawn mower in spaced relation to the mower discharge chute opening, so as to permit air flow thereby and to enable virtually unhampered bagging of the leaves picked up by the mower. The mulching attachment comprises a mulching plate which is disposed above the plane of the path of travel of the mower cutting blade, with a portion of the lower edge of the mulching plate being disposed closely adjacent to the upper surface of the cutting blade during rotation of the cutting blade so as to provide a shearing or scissoring cutting action in the area of the lower edge portion. The radial outermost portion of the lower edge of the mulching plate is shaped so as to permit air flow thereby. In one embodiment, a pair of plates are used to form the mulching plate so as to enable the size of the mulching attachment to be adjusted to accommodate mowers of different types and sizes.

19 Claims, 2 Drawing Sheets

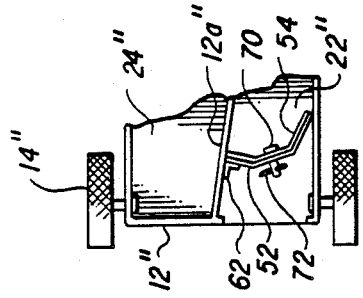
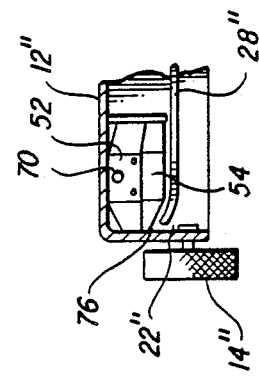
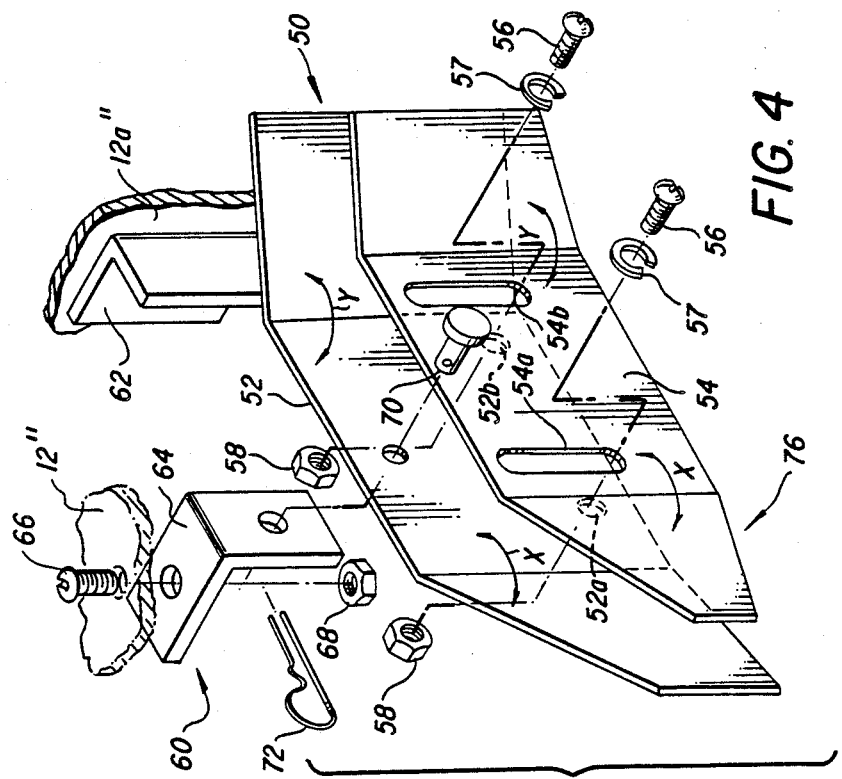

MULCHING ATTACHMENT FOR LAWN MOWERS

FIELD OF THE INVENTION

The present invention relates to mulching devices for mulching leaves and like materials, and, more particularly, to a mulching attachment for a lawn mower or the like which permits use of the mower for mulching and bagging of leaves.

BACKGROUND OF THE INVENTION

Lawn mowers with bagging attachments are often used to mulch leaves and other debris on a lawn in order to avoid raking of the leaves and to provide a good mulch to use in gardens, around shrubs and elsewhere. Ordinary lawn mowers are only moderately effective in providing such mulching in that leaves are only partially cut up and fine comminution of the leaves is generally not possible.

A number of techniques and devices have been developed which are designed to improve the mulching action of a lawn mower, and patents of possible interest in this field include: U.S. Pat. No. 4,189,904 (Paker); 4,326,370 (Thorud); 4,435,949 (Heismann); 4,665,683 (Paolucci); and 4,726,178 (Mallaney et al).

Briefly considering these patents, the Paker patent discloses a leaf mulcher attachment for lawn mowers which is in the form of a plate adapted for positioning in front of the grass ejection chute of the mower. The plate includes a plurality of tines and openings spaced therealong, and is connected by screws to the housing of the mower. The Thorud patent discloses a rotary lawn mower wherein discharge ports are blocked to provide operation of the mower as a mulcher, with the grass clippings being discharged from a tunnel in a substantially downward direction. The Mallaney et al patent discloses a discharge cover assembly which, in one mode, provides a cover plate which covers the discharge opening of the mower to produce a mulching action. The Heismann patent discloses a mulching adaptor for a rotary lawn mower which includes a cover plate used to block the discharge opening of the discharge chute. The Paolucci patent discloses an adaptor for collecting and distributing leaves which surrounds the entire deck of the lawn mower.

In general, prior art mulching attachments and devices basically involve blocking of a discharge chute or opening to provide re-cutting of the leaves into small pieces and because the discharge opening is blocked, do not permit use of a bagger with the mower to collect the mulched leaves.

SUMMARY OF THE INVENTION

In accordance with the invention, a removable mulching attachment is provided for mulching leaves, grass and other lawn debris, which produces excellent mulching, including substantially improved results in leaf size reduction as compared with ordinary mowers, and which still enables virtually unhampered bagging of the leaves. The mulching attachment, which basically comprises a mulching plate or insert, modifies the air flow pattern with the mower deck or base and creates a scissoring action in connection with the mower blade. The modified air flow pattern so created directs the leaves which are picked up by the action of the mower blade to an area of the bottom edge of mulching plate in the vicinity of the heel, at which the scissoring action referred to above produces mulching of the leaves, achieving a typical size reduction of about eight to one. The mulching plate basically narrows or reduces the air flow path which results in an increase in air flow speed at the discharge chute, thereby maintaining the efficiency of the bagging action.

The mulching attachment of the invention provides a number of important advantages over the prior art. First, the invention permits a conventional lawn mower to also be used as a mulching apparatus, thereby providing two machines in one and thus affording the consumer substantial savings. In addition, the invention substantially eliminates the need for raking (except in areas where there is no room for a mower). Because of the leaf size reduction ratio provided, fewer trash bags are needed where the mulched leaves are simply to be disposed of, thereby providing added cost savings. Thus, as can be seen from the foregoing and as will be evident from that which follows, the invention is both a time saver and a labor saver. In this regard installation of the mulching attachment can be very easily and quickly carried out. Moreover, the mulching attachment of the invention can be manufactured relatively cheaply, adding to the cost savings referred to above.

In accordance with one aspect thereof, the invention comprises, in combination, a lawn mowing machine comprising a cutting blade, a housing for the cutting blade defining a cavity in which the blade rotates and including a discharge chute including a discharge opening through which materials cut by the cutting blade exit from the housing, a plurality of wheels secured to the housing, and drive means for causing rotation of the cutting blade within the cavity of said housing; and a mulching member detachably secured to the housing within the cavity, in spaced relation to the discharge chute opening, so as to permit air flow thereby and detachable mounting means for detachably securing the mulching member to the housing so as to enable the mulching member to be readily removed from the mowing machine so that the mowing machine can be used for its ordinary intended purpose. The mulching member is disposed above the plane of the path of travel of the cutting blade and at least a portion of the lower edge of the mulching member is disposed closely adjacent to the upper surface of the cutting blade during rotation of the cutting blade so as to cooperate with the rotating blade to provide a shearing or scissoring cutting action in the area of the lower edge portion as discussed above.

Preferably, the radial outermost portion of the lower edge of the mulching member is shaped so as to permit air flow thereby. Further, the lower edge of the mulching member preferably comprises substantially straight portion inboard of the radial outermost portion, disposed in closely spaced relationship to the upper surface of the cutting blade during rotation of the blade. The spacing between the straight portion of the mulching member and the upper surface of the blade is advantageously between $\frac{1}{8}$ inch and $\frac{1}{2}$ inch, and, optimumly, this spacing is about $\frac{1}{4}$ inch. In one preferred embodiment, the mulching member is curved when viewed in plan, while in another preferred embodiment, the mulching member, when viewed in plan, comprises flat sections disposed at an obtuse angle to one another. Further, the mulching member can comprise a single piece mulching plate or, in an embodiment adapted to fit different size mowers, comprises first and second plates adjustably and detachably secured together.

In an advantageous embodiment, the detachable mounting means comprises a bracket installed on the mower housing and a detachable pin and cooperating retaining clip for detachably mounting the mulching member on the bracket. Preferably, the mounting means also comprises an abutment bracket installed on a wall of the housing for engaging and abutting one end of the mulching member.

In accordance with a further aspect thereof, the invention comprises an adjustable mulching attachment assembly for a lawn mower, including a mower blade and discharge opening, for enabling the mower to provide mulching and bagging of leaves picked up thereby, the mulching attachment assembly comprising first and second mulching plates; adjustable securing means for adjustably securing the plates together so as to enable the overall vertical height of the plates, when secured together, to be varied so as to accommodate mowers of different sizes; and mounting means for detachably mounting the plates, when secured together, to the mower above the plane of the mower blade, and in spaced relation to the discharge opening of the mower. At least the lowermost of the plates is shaped so as to permit air flow past the radially outermost edge of that plate when the mulching attachment is attached to the mower.

Preferably, the first and second plates include openings therein which are aligned when the plates are secured together, and the adjustable securing means comprises at least one fastener assembly for, in cooperation with the aligned openings, securing the plates together. Advantageously, the at least one fastener assembly comprises a bolt, lockwasher and nut. The attachment means preferably comprises a bracket and a pin and retaining clip arrangement, as mentioned above and described in more detail below.

Other features and advantages of the invention will be set forth in, or apparent from, the detailed description of preferred embodiments of the invention which follows.

BRIEF DESCRIPTION OF THE DRAWINGS

FIG. 4 is an exploded perspective of a mulching attachment assembly in accordance with a further embodiment of the invention;

FIG. 5 is a top plan view similar to that of FIGS. 2 and 3, but partially broken away, showing a rear discharge mower incorporating the mulching attachment of the invention; and FIG. 6 is a front elevational view, partially broken away and partially in cross section, of the mower of FIG. 5.

DESCRIPTION OF THE PREFERRED EMBODIMENTS

Figure 1:
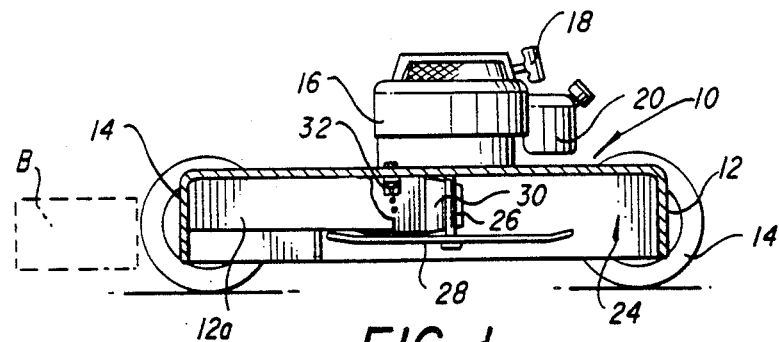
FIG. 1 is a side elevational view, partially in longitudinal cross section and partially broken away, of a lawn mower incorporating the mulching attachment of the present invention.
Figure 2:
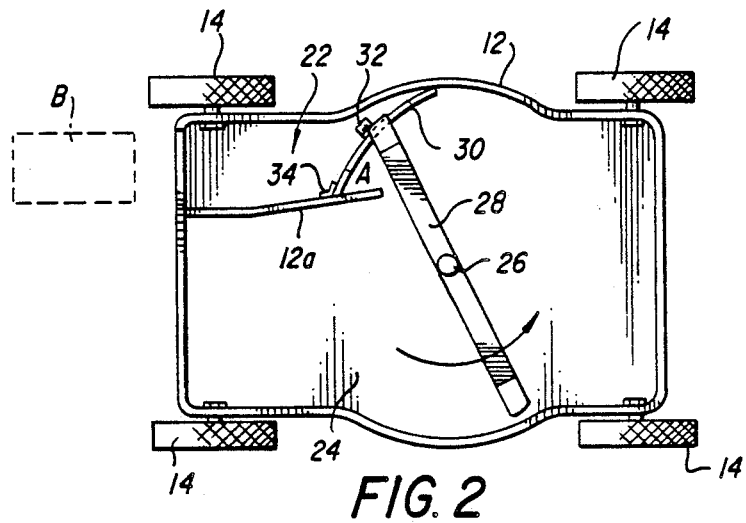
FIG. 2 is a top plan view, partially in cross section, of the lawn mower of FIG. 1.

Referring to the drawings, a mower in which the invention is incorporated is identified in FIGS. 1 and 2 at 10 and includes a base or deck 12 having four wheels 14 and supporting an engine 16 with a pull cord 18, and a gasoline tank 20. It will be appreciated that the construction and design of the particular mower to which the invention is applied forms no part of the invention and that the invention is applicable to many different mower designs and constructions. In accordance with the preferred embodiment of the invention illustrated in FIGS. 1 and 2, the mower illustrated provides for rear discharge of the clippings, via a discharge chute or passage indicated at 22. The invention is also applicable to mowers providing other different kinds of discharge, such as side discharge, as discussed below in connection with FIG. 3.

Referring particularly to FIGS. 1 and 2, which are, respectively, a partially transverse cross section, through the base or deck 12 of mower 10, and a cross section looking down from the base 12, the base 12 defines a cavity 24 into which extends a drive shaft 26 for a cutting blade 28, the drive shaft 26 being driven by engine or motor 16 in a conventional manner. In accordance with the invention, a mulching plate 30 is secured within cavity 26 which extends into discharge chute 22 and the bottom edge of which is disposed in spaced relation to the horizontal plane defined by the path of travel of blade 28. Mulching plate 30 is preferably secured, in a removable manner to the top of mower base 12 and in accordance with one presently preferred embodiment of the invention, is removably attached by a pin and L-shaped bracket arrangement indicated at 32 and described in more detail below in connection with FIG. 4. A further L-shaped bracket 34, also described below in connection with FIG. 4, is secured to the internal wall 12a of a base 12 which defines discharge or outlet chute 22 and abuts against, but is not attached to plate 30. It will be understood that mulching plate 30 can be secured in place within cavity 14 in many different ways and that, for example, one or more upstanding ears or projections (not shown) can be formed on the upper edge of plate 30 which would be designed to extend through corresponding openings in base or deck 12 and secured in place by bolts or other suitable securing means or devices.

In the illustrated embodiment, plate 30 is at least disposed partially within chute 22 between wall 12a which defines chute 22 and the side wall of base 12. In general, plate 30 should be located between the point or area where the leaves and/or other materials are cut by the blade 28 and the point or area where the leaves are discharged through the discharge chute 22, and disposed such that the plate 30 provides a scissoring action in cooperation with blade 28 to cut the leaves. In FIG. 2, the leaves are generally directed toward the area indicated at A where they are cut with a scissoring action created between blade 28 and mulching plate or insert 30.

Advantageously, the clearance between the bottom edge of the plate 30 and the top surface of blade 28 should be between $\frac{1}{8}$ inch and $\frac{1}{2}$ inch, with a $\frac{1}{4}$ inch clearance generally being optimum. As indicated in FIG. 1, the bottom edge of plate 30 is partially tapered so that while the spacing between the bottom edge of the plate 30 and the blade 28 is, for example, $\frac{1}{4}$ inch in the area beginning at the heel of the plate 30, i.e., the edge adjacent to wall 12a, and extending to about the middle of plate 30 the thickness of plate 30 is less at the tip or toe thereof, adjacent to the wall of the deck or base 12, so as to accommodate so-called "high-lift"

blades, i.e., blades that include an upwardly curved end or tip portion. The spacing between the plate 30 and the blade 28 remains the same in this area.

Figure 3:
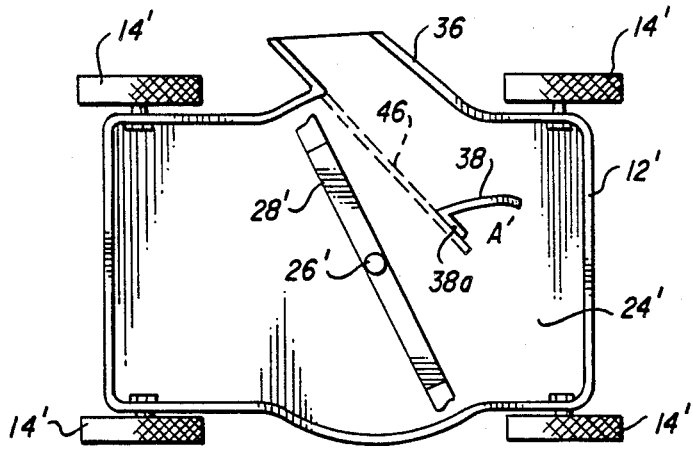
FIG. 3 is a top plan view, similar to that of FIG. 2, of a further embodiment of the invention as incorporated in a side discharge lawn mower.

Referring to FIG. 3, a further embodiment of the invention is shown which is similar to that of FIGS. 1 and 2 and in which like elements have been given the same reference numerals with primes attached.

As mentioned above, the mower 10' of FIG. 3 is a side discharge mower with the side discharge chute being indicated at 36. A mulching plate or insert 38, similar to plate 30 of FIG. 1, is provided upstream of the discharge chute 36 and disposed within cavity 24' such that the lower edge thereof is located just above the plate defined by the path of travel of the blade 28', similarly to plate 30. Mulching insert 33 preferably includes a projecting flange or leg 38a and, in accordance with an advantageous embodiment, an auxiliary plate, indicated in dashed lines at 40 is provided against which flange 38a abuts. Mulching plate or insert 38 is preferably attached to, i.e., suspended from, the top of base 12' by suitable means such as those described above in connection with FIGS. 1 and 2. In the embodiment of FIG. 3, the leaves collect in the area A' where they are cut by blade 28', a scissoring or enhanced cutting action provided by blade 28, in cooperation with plate 38.

Referring to FIGS. 4 to 6, a mulching plate assembly in accordance with one preferred embodiment of the invention is shown in FIG. 4, and is shown in place on a mower in FIGS. 5 and 6. The mower of FIGS. 5 and 6 is similar to that of FIGS. 1 and 2 (except that the rear discharge chute is on the opposite side) and like elements have been given the same reference numerals with double primes attached. As discussed above, the mulching plate of the invention may be of one piece construction and, when manufactured for use with a particular mower, would normally be of such a one piece construction as designed to fit that mower. However, the embodiment of FIG. 4, in which the mulching insert, which is generally denoted 50, comprises two separate plate members or plates 52 and 54 that can be adjusted relative to one another, provides added versatility in that the insert can be adjusted to accommodate mowers of different makes, models, types and sizes. Although the mulching insert 50 can be curved as illustrated in connection with the previous embodiments, to make manufacture easier the plates 52 and 54 forming insert 50 can also comprise flat section bent at two places as illustrated in FIG. 4 to approximate this curvature. In a specific, exemplary embodiment, the angle X shown in FIG. 4 is 165° and the angle Y is 140°. Lower plate 54 includes a pair of elongate slots 54a, 54b therein which are matched to openings 52a, 52b of upper plate 52, and pairs of bolts 56, lock washers 57 and nuts 58 are used to affix the plates together to provide a mulching insert of the appropriate vertical height.

As mentioned above in connection with the embodiment of FIGS. 1 and 2, in accordance with a preferred embodiment of the invention, the mulching plate 50 is removably affixed in place by a pin and bracket assembly or arrangement, denoted 60 in FIG. 4 and corresponding to assembly 32 of FIGS. 1 and 2, and an abutment bracket, denoted 62 in FIG. 4 and corresponding to bracket 34 of FIG. 2. As illustrated in FIG. 4, pin and bracket assembly 60 includes an L-shaped bracket 64, one leg of which is permanently secured by a screw 66 and nut 68 to the top wall of the mower base or deck (blade housing) 12". Bracket 64 is permanently secured in place in the sense that, after installation, bracket 64 remains secured to the mower even when the mulching insert 50 is removed. The upper plate 52 of insert 50 is detachably secured to the other, downwardly depending leg of bracket 64 by a pin 70 and a retaining clip 72.

Bracket 62 is also L-shaped and during installation one leg is permanently attached by bolts 74 and corresponding lockwashers and nuts (not shown) to the internal wall 12a" of base 12" which serves to define the discharge chute 22". The other, outwardly projecting leg or bracket 62 serves as an abutment which is engaged by one lateral edge of upper plate 52. The edge of plate 52 is preferably straight and lines up with the corresponding straight edge of lower plate 54 when the plates are assembled together. As shown in FIG. 4, and perhaps more clearly in FIG. 6 (see also FIG. 1), the side of lower plate 54 positioned adjacent to the side wall of base 12" is tapered upwardly so that a gap 76 is created therebeneath so as to permit the passage of air thereby. As illustrated in FIGS. 5 and 6, the mulching plate 50 is mounted in the discharge chute 22" formed in the cavity 24" of housing 12" in a manner similar to mulching plate 30 of FIGS. 1 and 2.

Although the present invention has been described relative to exemplary embodiments thereof, it will be understood by those skilled in the art that variations and modifications can be effected in these exemplary embodiments without departing from the scope and spirit of the invention.

What is claimed is:

1. In combination, a lawn mowing machine comprising a cutting blade, a housing for said cutting blade defining a cavity in which said blade rotates and including a discharge chute including a discharge opening through which materials cut by said cutting blade exit from said housing, a plurality of wheels secured to said housing, drive means for causing rotation of said cutting blade within said cavity of said housing; and an imperforate, substantially vertically disposed mulching member detachably secured to said housing within said cavity, in spaced relation to said discharge chute opening, so as to permit air flow thereby, said mulching member being disposed above the plane of the path of travel of said cutting blade and extending generally transverse to the longitudinal axis of the discharge chute so as to guide said materials to an area below the lower edge of the plate, adjacent to the inlet end of the discharge chute and spaced inwardly from the wall of the housing and at least a portion of the lower edge of the mulching member being disposed closely adjacent to the upper surface of the said cutting blade during rotation of the cutting blade so as to cooperate with the rotating blade to provide a shearing or scissoring cutting action in said area, and detachable mounting means for detachably securing said mulching member to said housing so as to enable said mulching member to be readily removed from said mowing machine.

2. The combination claimed in claim 1 wherein the radial outermost portion of the lower edge of said mulching member is shaped so as to permit air flow thereby.

3. The combination claimed in claim 2 wherein the lower edge of said mulching member comprises substantially straight portion inboard of said radial outermost portion disposed in closely spaced relationship to the upper surface of the cutting blade during rotation of the blade.

4. The combination claimed in claim 3 wherein the spacing between said straight portion and the upper surface of the cutting blade is between about ⅛ inch and ½ inch.

5. The combination claimed in claim 4 wherein said spacing is about ¼ inch.

6. The combination claimed in claim 1 wherein said mulching member is curved when viewed in plan.

7. The combination claimed in claim 1 wherein said mulching member when viewed in plan comprises flat sections disposed at an obtuse angle to one another.

8. The combination claimed in claim 1 wherein said mulching member comprises a single piece mulching plate.

9. The combination as claimed in claim 1 wherein said detachable mounting means comprises a bracket installed on said housing and a detachable pin and cooperating retaining clip for detachably mounting said mulching member on said bracket.

10. The combination as claimed in claim 9 wherein said mounting means further comprises an abutment bracket installed on a wall of said housing for engaging and abutting one end of said mulching member.

11. An adjustable mulching attachment assembly for a lawn mower, including a mower blade and discharge opening, for enabling the mower to provide mulching and bagging of leaves picked up thereby, said mulching attachment assembly comprising first and second mulching plates; adjustable securing means for adjustably securing the plates together so as to enable the overall vertical height of the plates when secured together to be varied so as to accommodate mowers of different sizes; and mounting means for attachably mounting the plates when secured together to the mower above the plane of the mower blade in spaced relation to the discharge opening.

12. The mulching attachment assembly as claimed in claim 11, wherein said plates include openings therein which are aligned when the plates are secured together, and said adjustable securing means comprises at least one fastener assembly for, in cooperation with said aligned openings, securing said plates together.

13. The mulching attachment assembly as claimed in claim 12 wherein said at least one fastener assembly comprises a bolt, lockwasher and nut.

14. The mulching attachment assembly as claimed in claim 11 wherein the bottom edge of said lowermost plate includes a relatively straight portion extending from the radially innermost side of the mulching attachment to at least the middle thereof which, in use, is disposed in closely spaced relationship with respect to the mower blade and a tapered portion to accommodate the curvature at the end of the mower blade while retaining substantially the same spacing.

15. The muching attachment as claimed in claim 11 wherein said mounting means comprises a bracket adapted to be installed on the mower and a detachable pin and cooperating retaining clip for detachably mounting said mulching plates on said bracket.

16. The mulching attachment as claimed in claim 11 wherein said mounting means comprises an abutment bracket adapted to be installed on a wall of the mower for engaging and abutting one end of the mulching plates.

17. The mulching attachment assembly as claimed in claim 11 wherein said mounting means comprises a first, abutment bracket adapted to be secured to a side wall of the mower so as to provide an abutment against which one end of the plates, when secured together, abut, a further bracket adapted to be secured to a top wall of the mower, a pin and retainer clip assembly for, in cooperation with said further bracket, detachably attaching the plates, when secured together, to the mower.

18. In combination, a lawn mowing machine comprising a cutting blade, a housing for said cutting blade defining a cavity in which said blade rotates and including a discharge chute including a discharge opening through which materials cut by said cutting blade exit from said housing, a plurality of wheels secured to said housing, drive means for causing rotation of said cutting blade within said cavity of said housing; and a mulching member detachably secured to said housing within said cavity, in spaced relation to said discharge chute opening, so as to permit air flow thereby, said mulching member being disposed above the plane of the path of travel of said cutting blade and at least a portion of the lower edge of the mulching member being disposed closely adjacent to the upper surface of said cutting blade during rotation of the cutting blade so as to cooperate with the rotating blade to provide a shearing or scissoring cutting action in the area of said lower edge portion, and detachable mounting means for detachably securing said mulching member to said housing so as to enable said mulching member to be readily removed from said mowing machine, said mulching member comprising first and second plates detachably secured together.

19. In combination, a lawn mowing machine comprising a cutting blade, a housing for said cutting blade defining a cavity in which said blade rotates and including a discharge chute including a discharge opening through which materials cut by said cutting blade exit from said housing, a plurality of wheels secured to said housing, drive means for causing rotation of said cutting blade within said cavity of said housing; and an imperforate, substantially vertically disposed mulching member secured to said housing within said cavity, in spaced relation to said discharge chute opening, so as to permit air flow thereby, said mulching member being disposed above the plane of the path of travel of said cutting blade and extending generally transverse to the longitudinal axis of the discharge chute so as to guide said materials to an area below the lower edge of the plate, adjacent to the inlet end of the chute and spaced inwardly from the wall of the housing and at least a portion of the lower edge of the mulching member being disposed closely adjacent to the upper surface of the said cutting blade during rotation of the cutting blade so as to cooperate with the rotating blade to provide a shearing or scissoring cutting action in said area.

* * * * *